United States Patent [19]

Anderson et al.

[11] Patent Number: 5,215,943
[45] Date of Patent: Jun. 1, 1993

[54] CERAMIC MEMBRANES WITH ENHANCED THERMAL STABILITY

[75] Inventors: Marc A. Anderson, Madison, Wis.; Qunyin Xu, Plainsboro, N.J.; Brian L. Bischoff, Madison, Wis.

[73] Assignee: Wisconsin Alumi Research Foundation, Madison, Wis.

[21] Appl. No.: 725,851

[22] Filed: Jul. 2, 1991

Related U.S. Application Data

[63] Continuation-in-part of Ser. No. 376,107, Jul. 5, 1989, Pat. No. 5,028,568.

[51] Int. Cl.$^5$ .............................. C04B 35/49
[52] U.S. Cl. ...................... 501/12; 501/134
[58] Field of Search .................. 501/12, 134; 252/62.3 BT

[56] References Cited

U.S. PATENT DOCUMENTS

| | | | |
|---|---|---|---|
| 3,948,751 | 4/1976 | Bianchi et al. | 204/290 F |
| 4,003,817 | 1/1977 | Bianchi et al. | 204/290 F |
| 4,483,785 | 11/1984 | Johnson et al. | 252/520 |
| 4,517,068 | 5/1985 | Hinden et al. | 204/283 |
| 5,006,248 | 4/1991 | Anderson et al. | 210/510.25 |
| 5,028,568 | 7/1991 | Anderson et al. | 501/12 |

OTHER PUBLICATIONS

Ulrich, D. R., "Sol–Gel Processing," *Chemtech* 242-249 (Apr., 1988).
Reed, *Introduction to the Principles of Ceramic Processing*, 440, Wiley & Sons, New York, 1988.
Bradley, et al., "Structural Chemistry of the Alkoxides, Part I., Amyloxides of Silicon, Titanium, and Zirconium," *J. Chem. Soc.* 2027-2032 (1952).
Brown and Duwez, "The Zirconia-Titania System," 37 *J. Am. Ceram. Soc.* 129-132 (1954).
Anderson, et al., "Titania and Alumina Ceramic Membranes," 39 *J. Membrane Sci.* 243-258 (1988).

*Primary Examiner*—Karl Group
*Assistant Examiner*—C. Gallo
*Attorney, Agent, or Firm*—Quarles & Brady

[57] ABSTRACT

A method of creating a ceramic membrane with enhanced thermal stability is disclosed. The method involves combining quantities of a first metal alkoxide with a second metal, the quantities selected to give a preselected metal ratio in the resultant membrane. A limited amount of water and acid is added to the combination and stirred until a colloidal suspension is formed. The colloid is dried to a gel, and the gel is fired at a temperature greater than approximately 400° C. The porosity and surface area of ceramic membranes formed by this method are not adversely affected by this high temperature firing.

16 Claims, 16 Drawing Sheets

5,215,943

CERAMIC MEMBRANES WITH ENHANCED THERMAL STABILITY

CROSS REFERENCE TO RELATED APPLICATION

This application is a continuation-in-part of Ser. No. 07/376,107 filed Jul. 5, 1989, now U.S. Pat. No. 5,028,568.

FIELD OF THE INVENTION

The present invention relates, in general, to the production of ceramic membranes of metal oxides, and relates, in particular, to the preparation of metal oxide ceramic membranes with improved thermal stability due to a dopant added to the membrane during formulation.

BACKGROUND OF THE INVENTION

It is known that ceramic films or membranes may be made of metal oxide materials, such as titanium dioxide. Such membranes are typically made by a sol-gel process in which a metal oxide precursor, typically an organometallic compound such as a metal alkoxide, is dissolved in an alcohol at low temperature and hydrolyzed and peptized to create a colloidal suspension or sol. Such sols can be slowly dewatered or can be coated onto substrates to form gels, which can be sintered into ceramic membranes, either unsupported or supported. By controlling the conditions of the sol-gel process, the metal oxide can be manipulated to form particles of selected size, which when fused into a particulate membrane, results in a membrane of a selected average hole or pore size.

Normally in such membranes, porosity and conductivity are inversely related. This relation would be expected since increasing porosity is related to less contact between the sintered particles, and thus less surface area for electron flow. This property can, however, be a disadvantage in any application in which both high porosity and high conductivity are desirable.

One application in which both high porosity and high conductivity are desirable is the use of such a metal ceramic membrane as an electrode in an electrochemical cell. In such an application, it is desirable to have maximum surface area contact between the electrodes and the ionic solution of the cell. Higher porosity gives a higher effective surface area between the membrane used as an electrode and the solution into which it is placed. At the same time, it is clear that high conductivity is desirable for any material to be used as an electrode, to facilitate current flow into and out of the electrode from the appropriate electric circuitry.

Porosity and heat stability are also usually inversely related in metal oxide ceramic membranes. We have reported that microporous $TiO_2$ and $ZrO_2$ membranes have been successfully synthesized in our laboratory. However, the thermal stability of these membranes has been seriously challenged. These single component membranes are only able to withstand a temperature of below 350° C. in order to avoid closure of the micropores. In a general sense, ceramic materials formed by this low-temperature processing are not mechanically strong enough for many uses. It is desirable for such membranes to be as thermally stable as possible, in order to be useful in high-temperature applications.

Ceramic membranes prepared by sol-gel method are an assembly of individual particles, either crystalline or amorphous, containing pores. During the firing process, a number of chemical and physical changes in the membrane and its pores take place due to the applied heat. According to Reed (*Introduction to the Principles of Ceramic Processing*, p. 440, ed: Wiley & Sons, New York, 1988) the firing process may proceed in three stages: (1) presintering, in which the temperature is lower than one-half the melting point of a specific oxide; (2) sintering; and (3) cooling. Many chemical reactions and physical changes occur during the first presintering process. These reactions and changes include evaporation of liquids (which can be either contained in the pores or absorbed on the particle surfaces); burnout of binders and other organics associated with particles; decomposition of volatile inorganic acids, salts and other compounds which are used as additives in the preparative processing; and phase transitions which, among solid phases, refer to crystallization or transition between two crystalline phases. Sintering is a process associated with a decrease of surface energy by loss of surface area, usually with accompanying densification. Sintering, according to some authors, does not commonly begin until the temperature reaches a point where significant atomic diffusion within the material can occur. This temperature is reported to occur at the one-half to two-thirds of the melting point.

Microstructural changes in sintering process have been well-studied in past decades. Increase in particle size and decrease in porosity are two major features of changing microstructure of ceramic material during sintering. However, the microstructural variations in the presintering stage have not been well investigated. This is likely because of the difficulty of this research which arises from too many complicated reactions taking place simultaneously during this firing stage. In addition, microstructural variation with temperature largely depends on the nature of the individual material and its preparative history.

In contrast with completely sintered dense ceramic material, ceramic membranes are porous materials. These materials can only be fired at low temperatures, i.e. temperatures high enough to form a coherent body but no so high as to eliminate pores. Therefore, studies on the microstructural change in ceramic membranes during the presintering process, which are usually ignored by many ceramists, become important. The micropores in $TiO_2$ or $ZrO_2$ membranes prepared by sol-gel method seem to disappear by mechanisms associated with crystallization during the presintering process.

What is needed in the art of ceramic membranes formation is a metal oxide ceramic membrane of small pore size and high surface area with increased thermal stability.

SUMMARY OF THE INVENTION

The present invention is summarized in that a metal oxide particulate ceramic membrane is doped with a transition group metal to enhance the thermal stability of the membrane without adversely affecting its porosity or surface area. By "adversely affected," we mean that the pore size and surface area of the membrane fired at a temperature over 400° C. are still within useful limits.

The method of the present invention for creating the metal oxide ceramic membrane is as follows: A first metal alkoxide and a second metal alkoxide are combined in quantities selected to give a preselected metal ratio in the resulting membrane. A limited amount of water and acid is added to the combination to peptize the metal oxide. The solution is stirred until a colloidal suspension is achieved. The colloidal suspension is dewatered and a gel is formed. The gel is sintered into a unitary, durable, continuous ceramic membrane. This sintering is at a temperature greater than 400° C.

In another particularly advantageous embodiment of the present invention, the membrane contains mean pore diameters less than 40 Angstroms and a surface area greater than 40 $m^2/gm$.

In a particularly advantageous embodiment of the present invention, the first metal is titanium, the second metal is zirconium, and the amount of zirconium in the ceramic membrane is less than 30% or greater than 80%.

In another particularly advantageous embodiment of the invention, the first metal is titanium, the second metal is vanadium, and the amount of vanadium in the ceramic membrane is less than 30%.

It is an object of the present invention to provide a sol-gel method of fabricating metal oxide ceramic membranes with pore sizes of less than 40 Angstroms and surface areas of greater than 40 $m^2$/gram with enhanced thermal stability.

It is another object of the present invention to provide a sol-gel method of fabricating metal oxide ceramic membranes in which a dopant metal can be inherently integrated into the membrane during its fabrication.

It is yet another object of the present invention to create a zirconium-doped titanium dioxide ceramic membrane combining good qualities of porosity and thermal stability.

It is yet another object of the present invention to create a titanium-doped zirconium dioxide ceramic membrane combining good qualities of porosity and thermal stability.

It is an advantage of the present invention that ceramic membranes useful in high temperature separations and other high temperature processes may be created.

Other objects, advantages and features of the present invention will become apparent from the following specification when take in conjunction with the accompanying drawings.

DETAILED DESCRIPTION OF THE INVENTION

Figure 1:
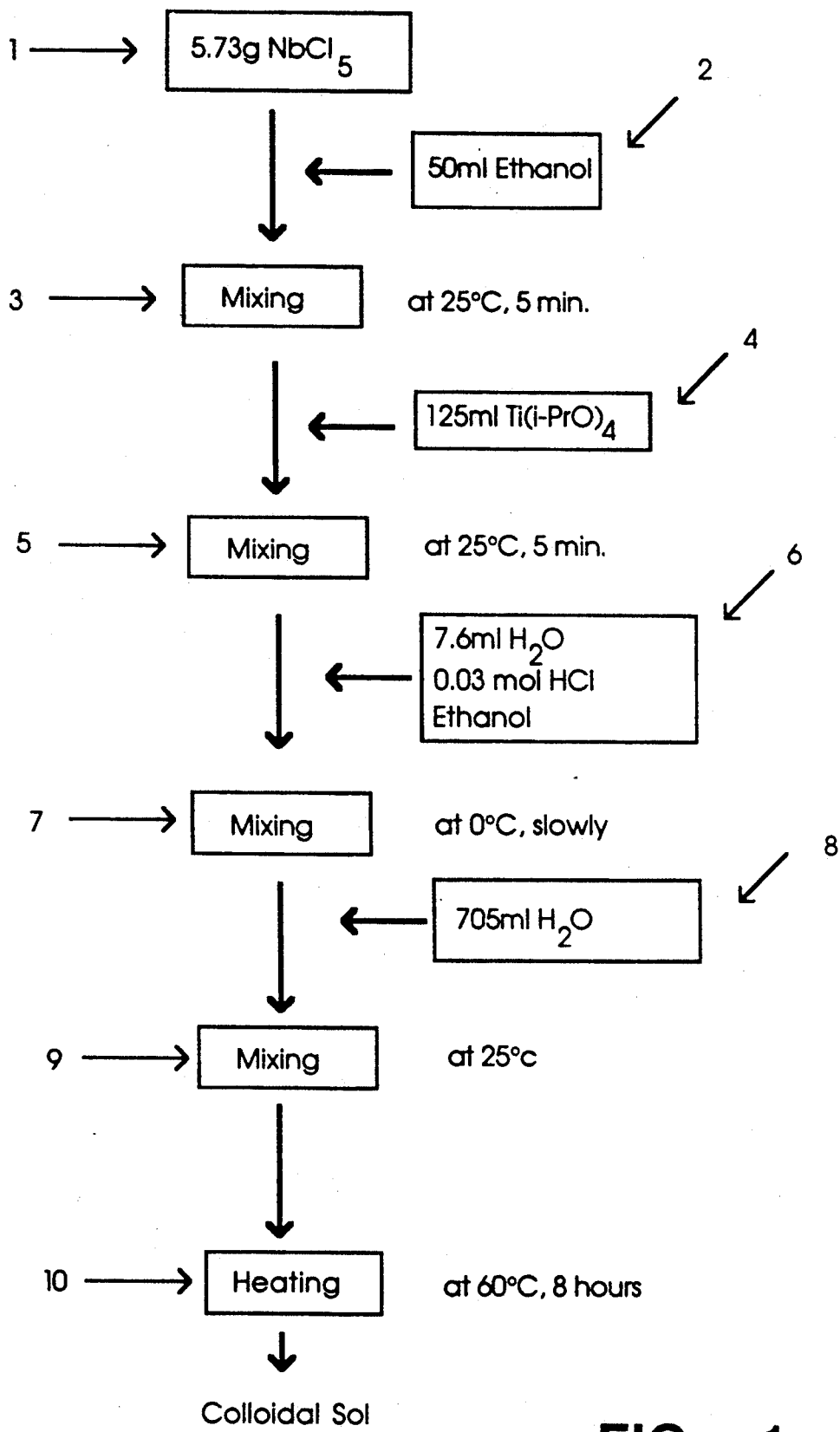
FIG. 1 is a schematic illustration of a flowchart of the process of creating a niobium-doped membrane.

The present invention is directed toward the creation of particulate metal oxide ceramic membranes which have been doped with a transition metal so as to improve the thermal stability of the membranes. Such membranes have specific utility in high temperature separation processes.

Metal oxide particulate ceramic membranes are created through a sol-gel process followed by sintering to create a ceramic material. The sol-gel process is intended to create particles of defined size, in the colloid stage, which are then condensed into a gel, consisting of a dense suspension of the same small particles. The gel is then concentrated further and sintered to fuse the particles together, creating a porous ceramic material. Such a metal oxide ceramic membrane can be deposited on a substrate as a coating or exist as a film having independent structural characteristics.

Metal oxide ceramic membranes have been fabricated using many transition metals. Most commonly aluminum, zirconium, silicon, and combinations of these with titanium have been fabricated. Many other transition metals may also be used in the fabrication of such membranes, including lanthanum, germanium, tantalum, and zinc. We have added a dopant to metal oxide ceramic membranes and observed two phenomenon: (1) increased electrical conductivity and (2) increased thermal stability.

Metal Oxide Membranes with High Conductivity

When the doping material is intended to increase the electrical conductivity of the membrane, the element chosen to be the doping material increases the conductivity of the material matrix by adding either excess electrons or excess positive charge carriers (i.e. holes) into the matrix of material created in the particulate ceramic membrane. Thus, for example, using a titanium oxide ceramic membrane, since titanium is tetravalent in the form utilized in such a membrane, the doping material should be selected to be either trivalent or pentavalent. One preferable material useful as a dopant in a titanium oxide membrane is niobium, which exists in a pentavalent form. Obviously for differing metallic ceramic materials, a different transition metal dopants must be selected, varying by preferably one valence number from the metal which makes up the bulk of the metal ceramic oxide membrane.

The method used successfully here to advantageously introduce dopant materials into the metal oxide ceramic material is to begin with the dopant material in anhydrous alcohol solution. The alcohol solution containing the dopant is then incorporated into the metal alkoxide used as the starting material in a sol-gel process to prepare the metallic oxide ceramic material. In this fashion the dopant is incorporated into the colloidal suspension from the beginning of the process and therefore is incorporated in the colloidal particles in small quantities during the initial formation of the colloidal particles. Hence after the introduction of the material in the beginning of the process, the procedure for creating metal oxide ceramic membranes can be thereafter followed to create the incorporated dopant in the final supported or unsupported membrane.

It has been found that incorporating a dopant into a metal oxide particulate ceramic membrane in this fashion results in a product membrane advantageously combining several qualities. The doped membrane has an electrical conductivity which is several orders of magnitude higher than a similar membrane without the dopant, the exact increase varying with the level of dopant added. At the same time, the porosity and surface area remain high. Thus the membrane combines usually disparate qualities to be an attractive candidate for use in electrochemical, photochemical or other catalytic applications in which a combination of porosity and conductivity is desirable.

Metal Oxide Ceramic Membranes with Increased Thermal Stability

When the doping material is intended to increase the thermal stability of the membrane, the dopant element may be chosen more widely from the group of transition metal elements. Our Examples below disclose the use of vanadium and zirconium as dopants in titanium membranes, with increased thermal stability. Other transition metals are likely to be successful as well as dopants in titanium membranes.

Our examples also disclose zirconium membranes with a titanium dopant with increased thermal stability. Many transition metals are likely to be successful as dopants in zirconium membranes to increase thermal stability. We envision that membranes with more than one dopant, such as a titanium membrane with both zirconium and vanadium, will have further increased thermal stability.

Doped membranes may be prepared in the manner described above for niobium-doped titanium membranes. However, we typically employ other methods to produce mixed membranes when the starting materials are capable of forming metal alkoxides. Metal alkoxides may be available commercially. If not, we prepare them from other metal alkoxides by an alcohol exchange method as described by Bradley, et al. J. Chem. Soc., p. 2027 (1952).

All of the gels which are precursors of metal ceramic membranes are preferably prepared by the controlled hydrolysis of metal alkoxides. Two separate routes have been followed in synthesizing these gels. The first method ("water mix") utilizes hydrolysis of the alkoxide in water to form a sol. The second method ("alcohol mix") involves hydrolysis in alcohol, with a small amount of water added, to form a sol. Both types of sols are evaporated into gels and then sintered to form membranes.

In the "alcohol mix" method, freshly prepared alkoxide stock solutions are mixed and dissolved in alcohol to form a clear mixed alkoxide solution. This solution is stirred, preferably for one hour, to ensure complete mixing. Acidic water (pH=2, adjusted by $HNO_3$) is mixed with an equal amount of alcohol solvent. The acidic water is added to the mixed alkoxide with high speed stirring for approximately 0.5 hour. The mixture is then stirred until a sol is formed, 30 minutes to three hours.

In the "water mix" method, the metal alkoxides are also first dissolved in alcohol. A quantity of water is added to the mixed alkoxide with high speed stirring. A quantity of $HNO_3$ is added to peptize the suspension. The solution is heated for approximately eight to twelve hours at 60°–95°. After this heating, a colloidal sol is produced.

The procedure for forming a ceramic membrane from the sols of either method is identical. The sol is either dipped onto a supported membrane or is poured into a plastic container. In the Examples below, unsupported sols are dried and then fired at temperatures up to 800° C. Although the Examples disclose the formation of unsupported membranes, it is logical to expect that supported membranes with improved thermal stability could also be produced by similar methods, since unsupported single metal oxide membranes can readily be made by such methods.

The quantities of the stock alkoxides, $H_2O$, and alcohol used above are determined by the metal concentration desired in the final sol composition. The concentration of metal in the sol is determinative of the pore size in the resulting ceramic membrane. For small pore membranes (<50 Angstrom pore size), a preferable metal concentration in the sol is with an order of magnitude of 0.2M.

The percentage of the dopant in the ceramic membrane can be variable and still achieve high temperature stability. The Examples below show percentages of dopant from 1% to over 20% in which the ceramic membranes have achieved high temperature stability.

The process and product of the present invention can be better understood by reference to the following examples which are intended by way of illustration and not by way of limitation.

EXAMPLES

A. Creation of Niobium-Doped Titanium Membrane

This example describes the creation of a titanium dioxide particulate ceramic membrane doped with niobium. The beginning materials utilized were niobium pentachloride and titanium tetraisopropoxide. Also used as a starting material is anhydrous ethanol. The chemicals were used as purchased without further purification, and all water used in the reactions was deionized using a Mili-q water purification system as sold by Milipore Corp.

The process began with the selection of the molar ratio between water and titanium dioxide and also the ratio of dopant contained in the titanium matrix. Having selected a molar ratio between water and titanium dioxide of 99 to 1, and a molar ratio of atoms of titanium to niobium of 100 to 5, the procedure utilized began with the mixing of 5.73 grams of niobium pentachloride into 50 milliliters of anhydrous ethanol. The solution was then stirred for 5 minutes at room temperature to dissolve the niobium dopant salt. To the solution was then added 125 milliliters of titanium tetraisopropoxide. Again the reaction vessel was stirred for 5 minutes at room temperature as shown at 5. Shown in FIG. 1 is a schematic illustration of a flow chart illustrating this process. At FIG. 1 the process begins with the niobium pentachloride at step 1 with the ethanol added at step 2, and the mixing at step 3. The titanium isopropoxide was added at step 4.

Next, to this reaction solution was added in a sequence of slow drops, 108 milliliters of a solution which contained 7.6 milliliters of water, 0.03 molar hydrochloric acid and ethanol, as shown at 6 while cooling the solution with ice to approximately 0° C. After the addition of the peptizing acid was complete, 750 milliliters of water dilutent was added, while vigorously stirring the solution until it turned transparent. This dilution of the reaction vessel is necessary to obtain proper dilution of the niobium in the resulting colloid. This is indicated at 8 in the flow sheet of FIG. 1.

Thereafter the solution was mildly heated to 60° C. for 8 hours while continuous stirring occurred as illustrated at step 10.

This solution turned during the heated stirring 10 into a colloidal solution. Various runs of the colloidal solutions were coated onto glass and fired while others were dried in a plastic petri dish to form an unsupported membrane in the bottom of the petri dish. In any event, the colloidal concentrations thus formed, referred to as gels, were then fired at temperatures up to 500° C. to form a stable, hard and durable ceramic membranes.

This process of preparing the titanium ceramic membranes with the niobium doping was repeated with a niobium doping level which varied from 0 to 10% molar niobium of the total metal in the ceramic membrane.

The process was also repeated several times with a doping level of 5%, as in the example above, and the resulting gels were sintered at temperatures varying between 200° and 600° C. to determine the effect of heating temperature on surface area.

Figure 2:
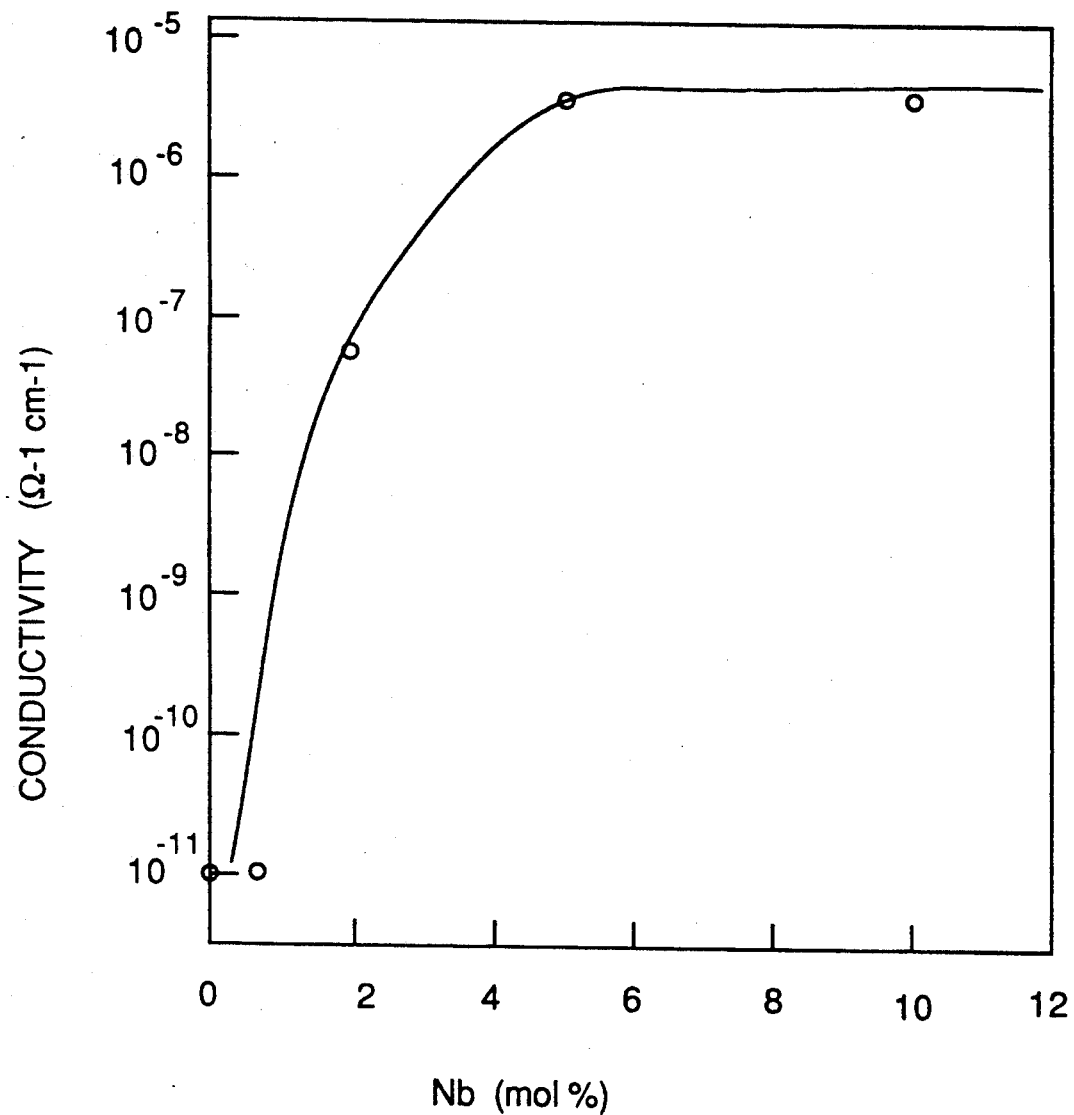
FIG. 2 is a graphical plot of conductivity versus level of niobim doping in an exemplary membrane constructed according to the present invention.
Figure 3:
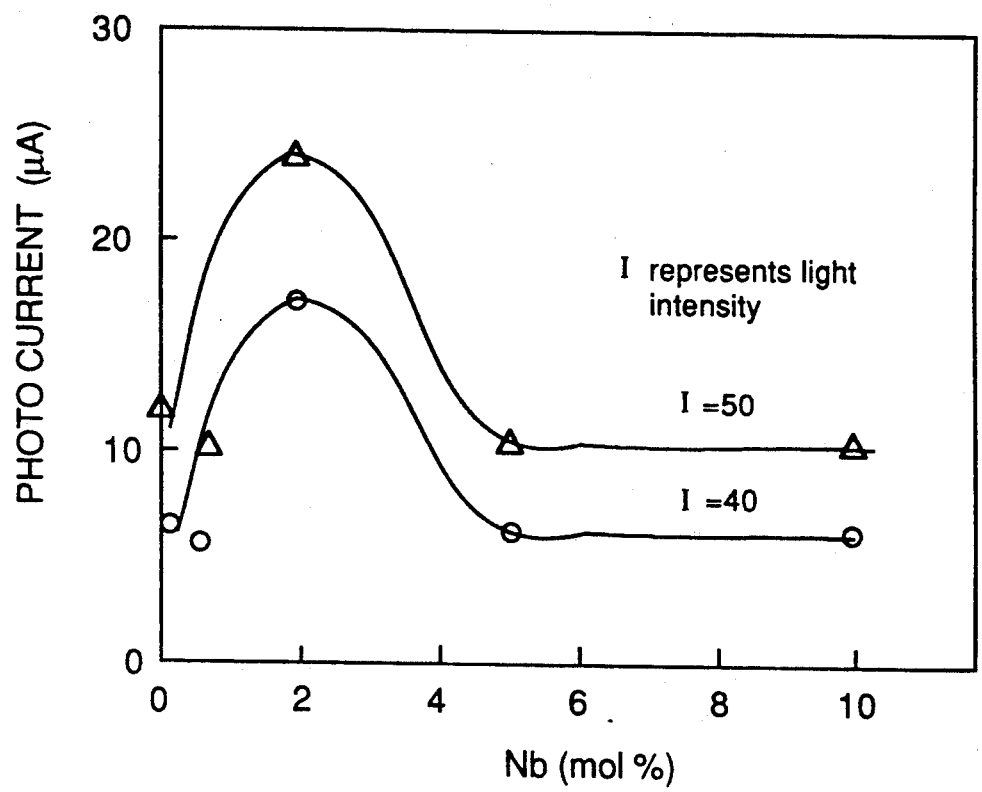
FIG. 3 is a graphical representation of photocurrent versus level of niobium doping in an exemplary membrane constructed according to the present invention.
Figure 4:
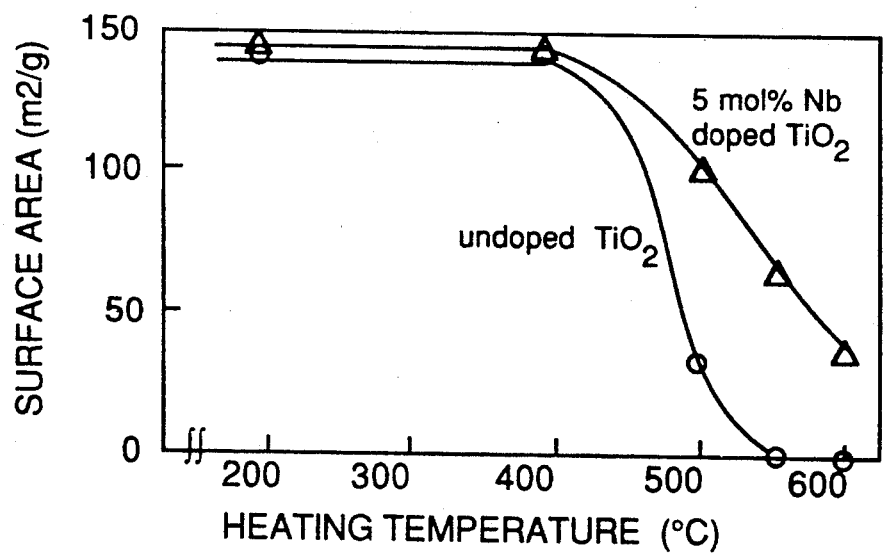
FIG. 4 is a graphical representation of specific surface area versus firing temperature in an exemplary membrane constructed in accordance with the present invention.

The results of these subsequent replications of the example are indicated in the charts of FIGS. 2 through 4. FIG. 2 illustrates the effect of niobium doping level on the conductivity of the titanium ceramic membrane. As can be viewed from the chart of FIG. 2, the difference in the conductivity of the titanium ceramic membrane between the level of 0% doping and a doping level of 5% niobium in the titanium membrane was a difference of 5 orders of magnitude in increased electrical conductivity. The conductivity did not seem to increase with further doping levels. However, an increase of 5 orders of magnitude in conductivity represents a dramatic increase in conductivity offering much greater utility in applications requiring electrical conduction through the ceramic membrane. The membranes from which the data in FIG. 2 were derived were fired at 600° for 3 hours.

Shown in FIG. 3 is a measurement of photocurrent at two different given and fixed levels of intensity of incident light radiation. The figure is intended to illustrate the relationship between the resultant photocurrent induced in the titanium ceramic membrane and the amount of niobium doping in the membrane. The results indicate that photocurrent initially increases with the level of doping in the titanium ceramic membrane to a local maximum of about 2 molar percentage of the total metallic material in the ceramic membrane.

For titanium ceramic membranes which are not doped, there tends to be a loss of porosity and thereby a loss of overall surface area as the heating temperature increases. Shown in FIG. 4 is a graphical illustration of the relationship between heating temperature and surface area for a niobium doped membrane doped at a level of 5% niobium in the titanium matrix. The chart illustrates that the niobium doped membrane retains its surface area through higher levels of heating temperature thereby indicating that its porosity is maintained through higher firing temperatures. This allows for the use of higher firing temperatures which creates a more stable and fixed membrane. The maintenance of high levels of porosity is obviously desirable in a membrane used for catalysis or photochemical applications since the surface area between the electrode and the solution into which it is introduced should be as large as possible so as to allow maximum interaction between the molecules of the ceramic material and the reaction solution.

B. Creation and Characterization of Mixed Membranes

1. Ti/Zr Membranes a. Preparation of Ti/Zr Membranes

Figure 5:
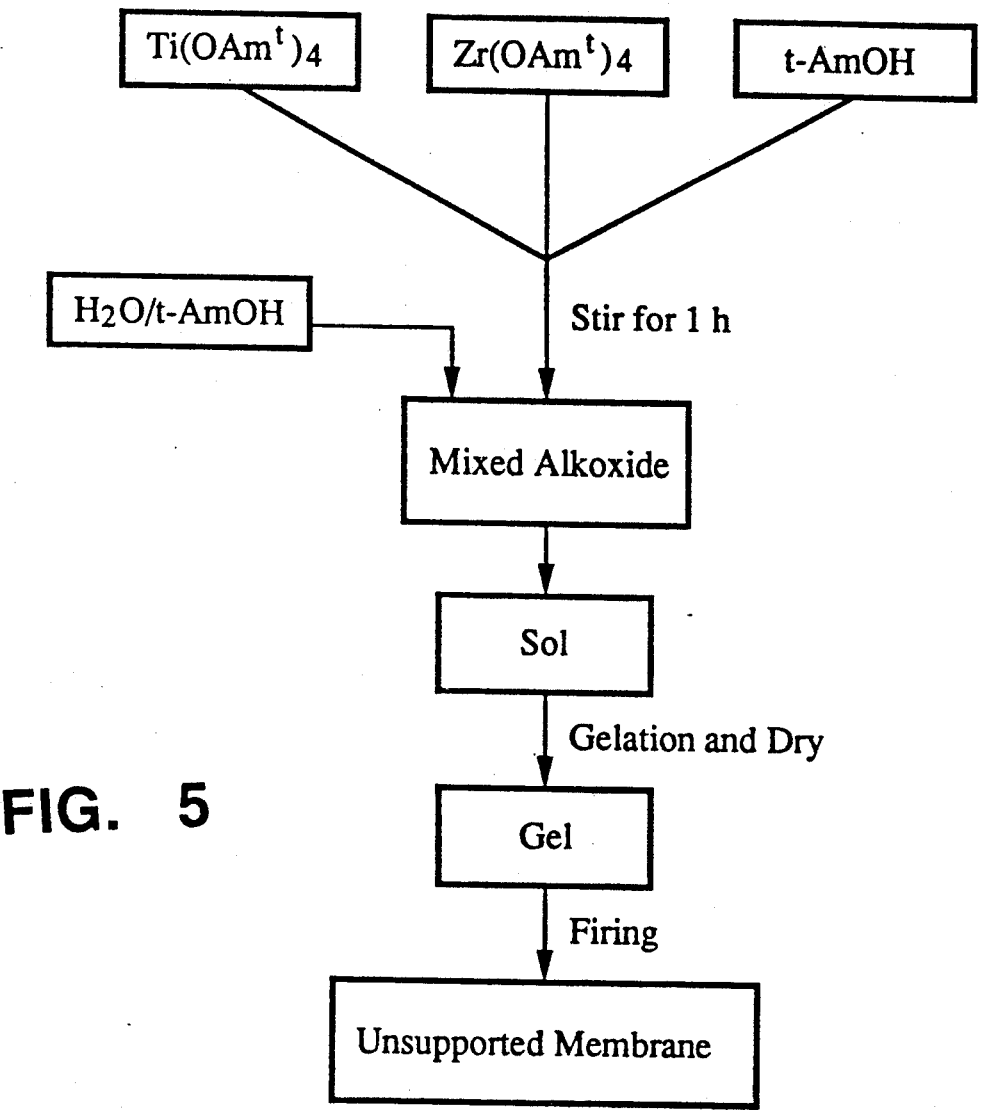
FIG. 5 is a schematic illustration of the process of creating a mixed titanium and zirconium membrane.

Unsupported Ti/Zr mixed oxide membranes were prepared by using an "alcohol based" sol-gel method similar to those previously disclosed in Anderson, U.S. Pat. No. 5,006,248 and Anderson, et al., *J. Memb. Sci.* 39: 243-258 (1988). FIG. 5 shows the general preparative procedure.

In general, metal alkoxides are first created. The metal alkoxides are mixed together and dissolved in alcohol. Acidic water is mixed with an equal amount of alcohol. The $H_2O$/alcohol mixture is then added drop-by-drop to the mixed alkoxides with violent stirring for approximately 15 minutes until a sol is formed. Alcohol is removed from such a sol to create a gel, which is a semisolid material. Further gelation and sintering of the gel results in a durable rigid material which can either be formed as an unsupported membrane or as a supported membrane coated onto a substrate.

In these particular membranes, titanium tetra-tert-amyloxide, $Ti(OAm^t)_4$, and zirconium tetra-tert-amyloxide, $Zr(OAm^t)_4$, were used as starting chemicals. Since these alkoxides are not available commercially, they were synthesized from other metal alkoxides by an alcohol exchange method as reported in Bradley et al., *J. Chem. Soc.*, p. 2027 (1952). $Ti(PrO^i)_4$ and $Zr(PrO^n)_4$ were used as the precursors for this exchange method.

Referring to FIG. 5, given amounts of freshly prepared $Ti(OAm^t)_4$ and $Zr(OAm^t)_4$ stock solutions were mixed and dissolved in an equal amount of tert-amyl alcohol (t-AmOH) to form a clear mixed alkoxide solution. In this Example, the amounts of $Ti(OAm^t)_4$ mixed $Zr(OAm^t)_4$ was adjusted so that the molar ratio of water to total metal was 1 to 2 and the percentage of zirconium as a percentage of total metal was varied in between 5% and 90%.

This solution was stirred for one hour to ensure complete mixing. Acidified water (pH=2, preadjusted by $HNO_3$) was separately dissolved in another equal amount of t-AmOH. In this particular Example, water was mixed with an equal amount of t-AmOH to be added to the mixed alkoxide solution. The quantities of the stock alkoxides, $H_2O$ and t-AmOH were adjusted to achieve a 0.2M metal concentration in the final sol. The molar ratio of $H_2O$ to total metal could be either 1 or 2.

We chose to evaluate several percentages of dopant. We prepared pure titanium and pure zirconium membranes, titanium membranes with 5%, 10%, 20%, and 30% zirconium and zirconium membranes with 10% and 20% titanium. These percentages were obtained by simply adjusting the stock alkoxide solutions to the desired percentage.

The acidified water was added in drops to the mixed alkoxide solutions with violent stirring for approximately 15 minutes. The mixture was stirred until a clear sol was produced. This sol was then placed in plastic dishes for gelation.

The slow evaporation of the alcohol was carried out in a desiccator chamber, producing clear gels after one week. To avoid cracking, extra time may be required to dry the gels completely before removal from the chamber. The dried, unsupported gels were then fired in the air up to 800° C. for 30 minutes. The resulting mixed oxide membrane pieces were employed in the further characterization of these materials.

b. Characterization Methods

Various means were used to characterize the porous structure, specific surface area, membrane porosity and pore size of the membranes. The porous structure of the membranes was characterized by nitrogen absorption experiments. Specific surface area was calculated from the BET equation. Membrane porosity was determined from the adsorption maxima. Pore size distribution based on either adsorption or desorption isotherms were calculated using the Kelvin equation. The mean pore diameter was determined by the peak value taken from the pore size distribution diagram. Data reduction was conducted by a computer program. Since the Kelvin equation is invalid in the microporous region (<2 nm in diameter), calculated distribution diagrams were always truncated at a pore diameter about 1.4 nm. For the samples with micropores, the distribution diagram giving a peak at a pore diameter less than 2 nm may not be accurate. That this peak really exists is indicated by the corresponding adsorption isotherm which was close to the Langmuir type, thus indicating the presence of micropores. For these samples, the mean pore diameter was assumed to be approximately 1.4 nm.

Thermal Gravimetry (TG) and Differential Thermal Analysis (DTA) were conducted on a Netzsch thermal analysis system in flowing air with a flow rate of 20 ml/min using 50 mg xerogel samples. Buoyancy and baseline corrections were performed by subtracting empty sample data from real sample data. The reference use for DTA measurement was $x$-$Al_2O_3$ which was fired at 1000° C. for 2 hours before use.

c. Characterization of Zr/Ti Mixed Metal Oxide Ceramic Membranes

Compared to a pure $TiO_2$ membrane, the addition of $ZrO_2$ into the membrane improved the thermal stability of micropores in the membrane. We found that either sintering-caused or crystallization-induced grain growth and decreased porosity has been retarded by mixing $ZrO_2$ into the $TiO_2$ membrane. The critical temperature of a $TiO_2$ membrane, at which the mean pore size of the membrane shifts from microporous region to mesoporous region, increases by over 200° C. as a result of introducing 20% $ZrO_2$ into the membrane. The thermal stability of pure $ZrO_2$ membrane has also been improving by adding $TiO_2$. A 100° C. increase in the critical temperature of micropore closure was achieved by doping 10% $TiO_2$ into a $ZrO_2$ membrane. Therefore, microporous membranes prepared by the sol-gel method can be made to be stable up to approximately 500° C. in the case of the $TiO_2$-rich membranes and up to approximately 400° C. for the $ZrO_2$-rich membranes. By "stable," we mean that the doped membrane exhibits at least 10% less change in mean pore diameter at a given firing temperature as compared to a single metal membrane. The doped titanium membranes remain microporous (mean pore diameter of less than 20 Angstroms) at firing temperatures of up to approximately 550° C. The doped zirconium membranes remained microporous at firing temperatures of up to approximately 420° C. Although porosity and surface area detrimentally changes in these doped membranes at higher firing temperatures, these changes could still be within parameters that allow the ceramic membrane to be useful for certain separation processes. In the middle range of mixing, $TiO_2$-$ZrO_2$ membranes were found to contain low surface area and low porosity.

Phase characterization of $TiO_2$-$ZrO_2$ mixed oxide membranes has been conducted based on DTA diagrams and x-ray diffraction patterns. These mixed oxide membranes, over the entire composition range, produced at the gel stage are all amorphous. When they are fired, crystallization takes place at temperatures which depend on the composition. Pure $TiO_2$ and pure $ZrO_2$ crystallize at the lowest temperature. Mixing of both components raises the crystallization temperature. We believed this rise in crystallization temperature to be one of the reasons of increasing the thermal stability of the membrane. The initial crystalline forms produced in particles vary with composition. Anatase and a solid solution with $ZrO_2$ are formed in $TiO_2$ membranes containing less than 100% $ZrO_2$. The phase dominating the products containing 20% to 50% $ZrO_2$ is $ZrTiO_4$ and its solid solution with extra $TiO_2$. A 60% $ZrO_2$-40% $TiO_2$ mixed oxide produces a greatly disordered $ZrO_2$ tetragonal phase.

Figure 6:
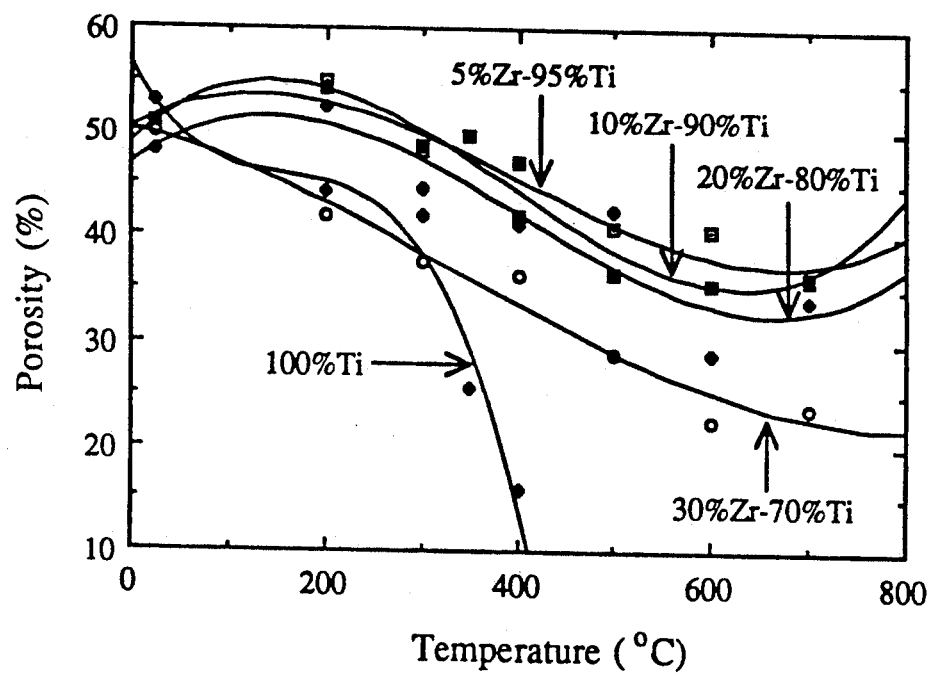
FIG. 6 is a graphical plot of firing temperature versus porosity for zirconium-doped titanium membranes.

FIG. 6–FIG. 14 detail the data that we obtained and examined. FIG. 6 illustrates the change in porosity with increasing firing temperature for a pure $TiO_2$ membrane and $ZrO_2$-doped $TiO_2$ membranes. We examined titanium membranes containing 5%, 10%, 20%, and 30% $ZrO_2$. As FIG. 6 illustrates, densification increases (or percentage porosity decreases) with increasing firing temperature in both pure and doped $TiO_2$ membranes. FIG. 6 indicates that $TiO_2$ membranes doped with less than 30% $ZrO_2$ retained more porosity than pure $TiO_2$ membranes in the firing temperature range examined. However, $TiO_2$ membranes doped with 30% $ZrO_2$ displayed less improvement than the 5%, 10% and 20% doped membranes against sintering-caused densification. It appears that this over-saturated doping changes the properties of $TiO_2$ particles such that they behave differently during the firing process.

Porosity of the pure $TiO_2$ membrane drops rapidly when firing temperature is raised to 350° C. This sudden drop in porosity is believed to be caused by crystallization of $TiO_2$ particles, which causes the closure of small intra-aggregate pores due to ordering small amorphous particles into large crystalline grains. We believe that addition of $ZrO_2$ into $TiO_2$ gel retards this sudden decrease in porosity by resisting crystallization.

Figure 7:
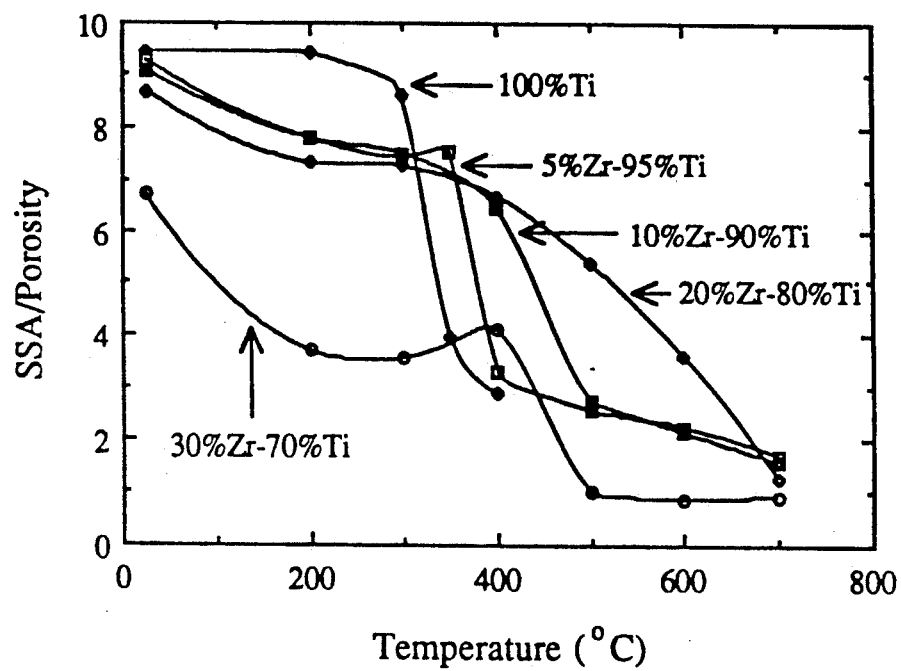
FIG. 7 is a graphical plot of firing temperature versus SSA/porosity for zirconium-doped titanium membranes.

The ratio of specific surface area (SSA) to porosity can be used to characterize membrane particle size. Plots of SSA/porosity values against firing temperature for pure $TiO_2$ and $ZrO_2$-doped $TiO_2$ membranes are shown in FIG. 7. A step-type drop in SSA/porosity occurs in the pure $TiO_2$ membrane fired at 300° C. This "step" is shifted to higher temperature for $TiO_2$ membranes doped with either 5% and 10% $ZrO_2$. There is no abrupt "step" found in the 20% $ZrO_2$-doped $TiO_2$ membrane. Once again, 30% $ZrO_2$-doping does not improve thermal stability as much as doping with lesser amounts of $ZrO_2$.

Figure 8:
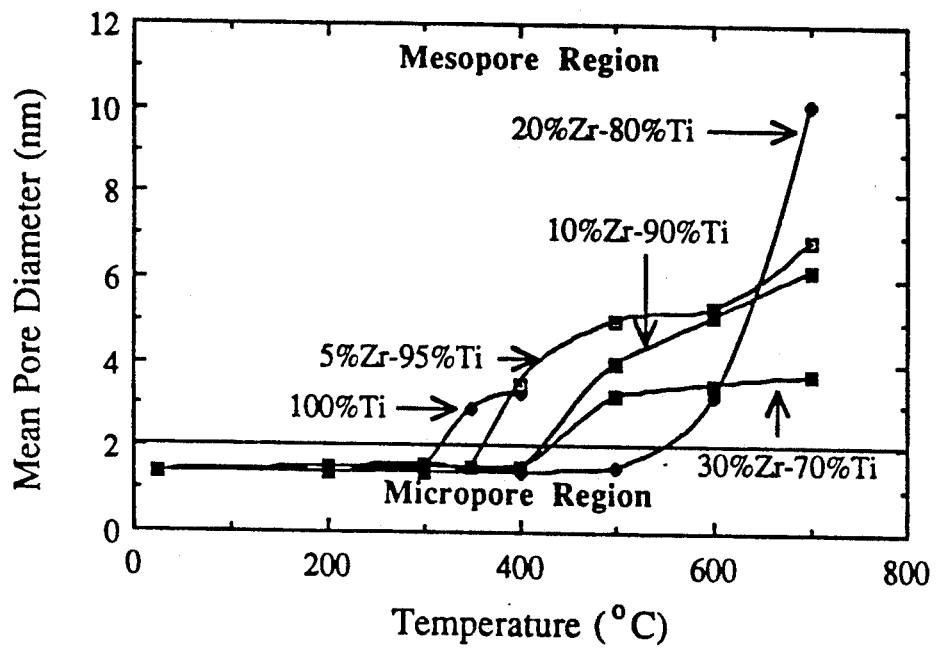
FIG. 8 is a graphical plot of firing temperature versus mean pore diameter for zirconium-doped titanium membranes.

A direct indication of the improved thermal stability of $TiO_2$ membranes as a result of $ZrO_2$-doping may be seen in FIG. 8. The mean pore size increases beyond the microporous (20 Angstrom) region at temperatures higher than 300° C. for pure $TiO_2$. This threshold increased to over 500° C. for $TiO_2$ membranes doped with 20% $ZrO_2$. The 30% $ZrO_2$-doped membrane had a mean pore diameter of below 20 Angstroms at a firing temperature of 400°.

Figure 9:
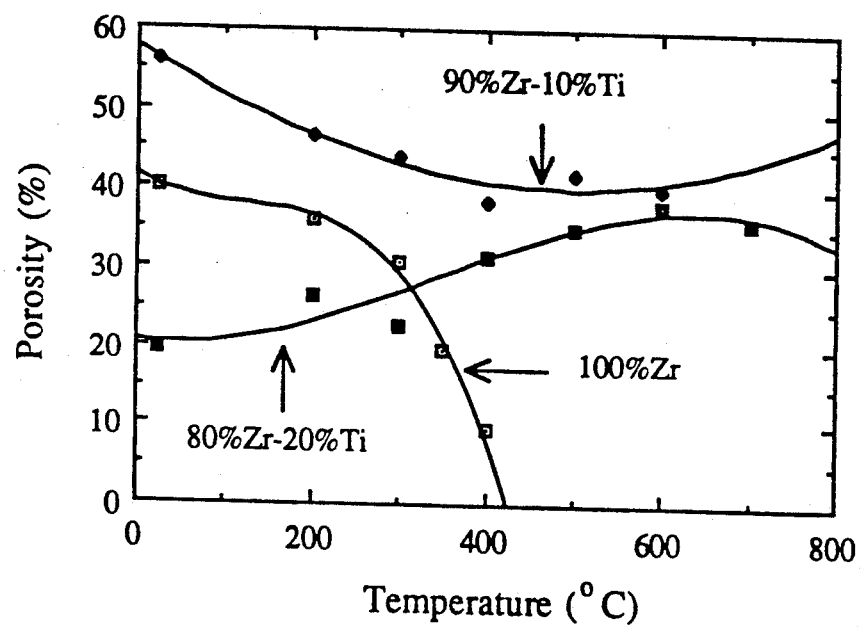
FIG. 9 is a graphical plot of firing temperature versus porosity for titanium-doped zirconium membranes.

Studies on $TiO_2$-doped $ZrO_2$ membranes have also been conducted. FIG. 9 shows $ZrO_2$ membrane porosity as a function of firing at different temperatures. In the pure $ZrO_2$ membrane, porosity decreases sharply at 300° C. A $ZrO_2$ membrane doped with 10% $TiO_2$ displays a higher percentage of porosity and better thermal stability. Particularly, the rapid decrease in porosity with increasing firing temperature for pure $ZrO_2$ disappears in the $TiO_2$-doped $ZrO_2$ membrane. This effect might be explained by the effect of doping on retarding crystallization of the original material.

A $ZrO_2$ membrane doped with 20% $TiO_2$ showed an unusual porosity profile with increasing temperature. It has a much lower porosity in the xerogel and in the lower temperature firing stage. Subsequently, porosity increases gradually at firing temperatures above 400° C. The reason for this increasing porosity is not clear, but seems to be related to crystallization of $ZrO_2$.

Figure 10:
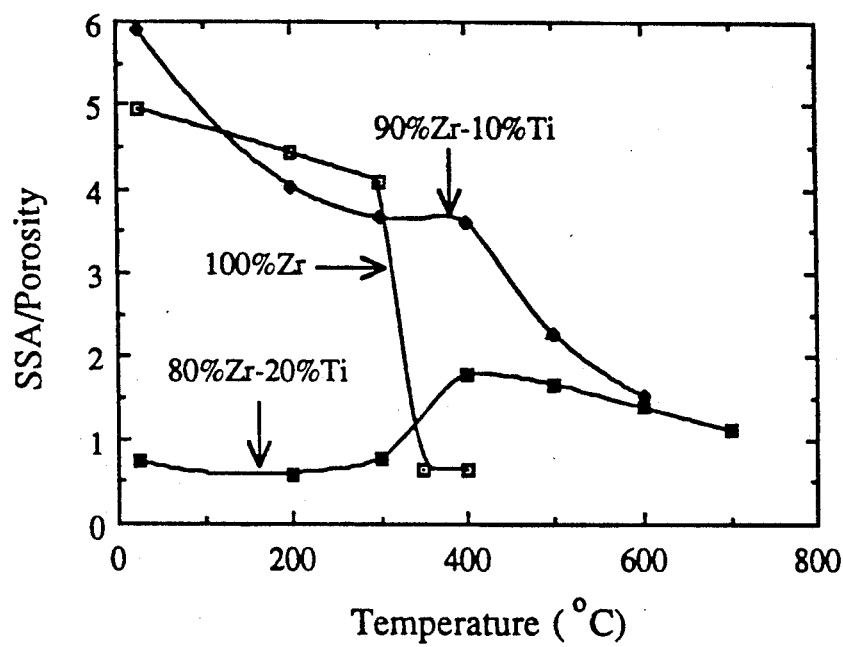
FIG. 10 is a graphical plot of firing temperature versus SSA/porosity for titanium-doped zirconium membranes.

We investigated particle size increases with increasing temperature with respect to pure $ZrO_2$ and $TiO_2$-doped $ZrO_2$ membranes. FIG. 10 illustrates that the ratio of SSA/porosity, which is inversely proportional to the particle size, changes with firing temperature. The same "step-type" curve as found in the pure $TiO_2$ membrane represents the particle size change upon firing in the pure $ZrO_2$ membrane. Referring to FIG. 10, this firing temperature-dependent increase in particle size can be improved by doping with 10% $TiO_2$.

A 20% $TiO_2$-doped $ZrO_2$ membrane has a completely different profile property. The SSA/porosity value starts at a very low level, then increases rapidly at 400° C., and is then followed by slight decrease with further temperature increases. This type of variation is similar to that of corresponding porosity curve.

Figure 11:
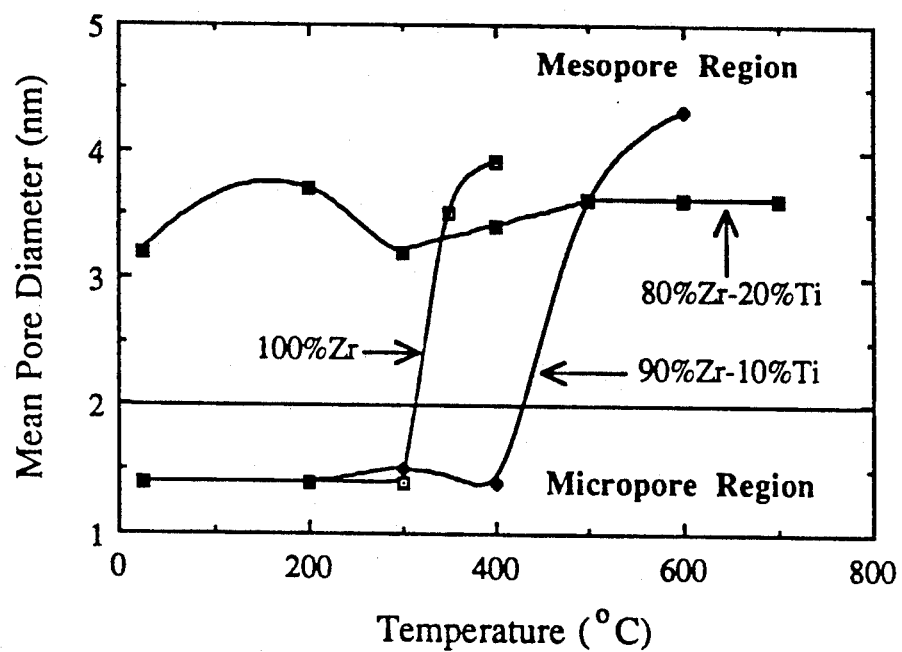
FIG. 11 is a graphical plot of firing temperature versus mean pore diameter for titanium-doped zirconium membranes.

The mean pore size of the pure $ZrO_2$ and $TiO_2$-doped $ZrO_2$ membranes as a function of firing temperature is plotted in FIG. 11. The pure $ZrO_2$ membrane contains micropores at a firing temperature below 300° C., while a 10% $TiO_2$-doped $ZrO_2$ membrane retains micropores during firing at 400° C. A $ZrO_2$ membrane doped with 20% $TiO_2$ contains mesopores instead of micropores regardless of what temperature at which it is fired.

Figure 12:
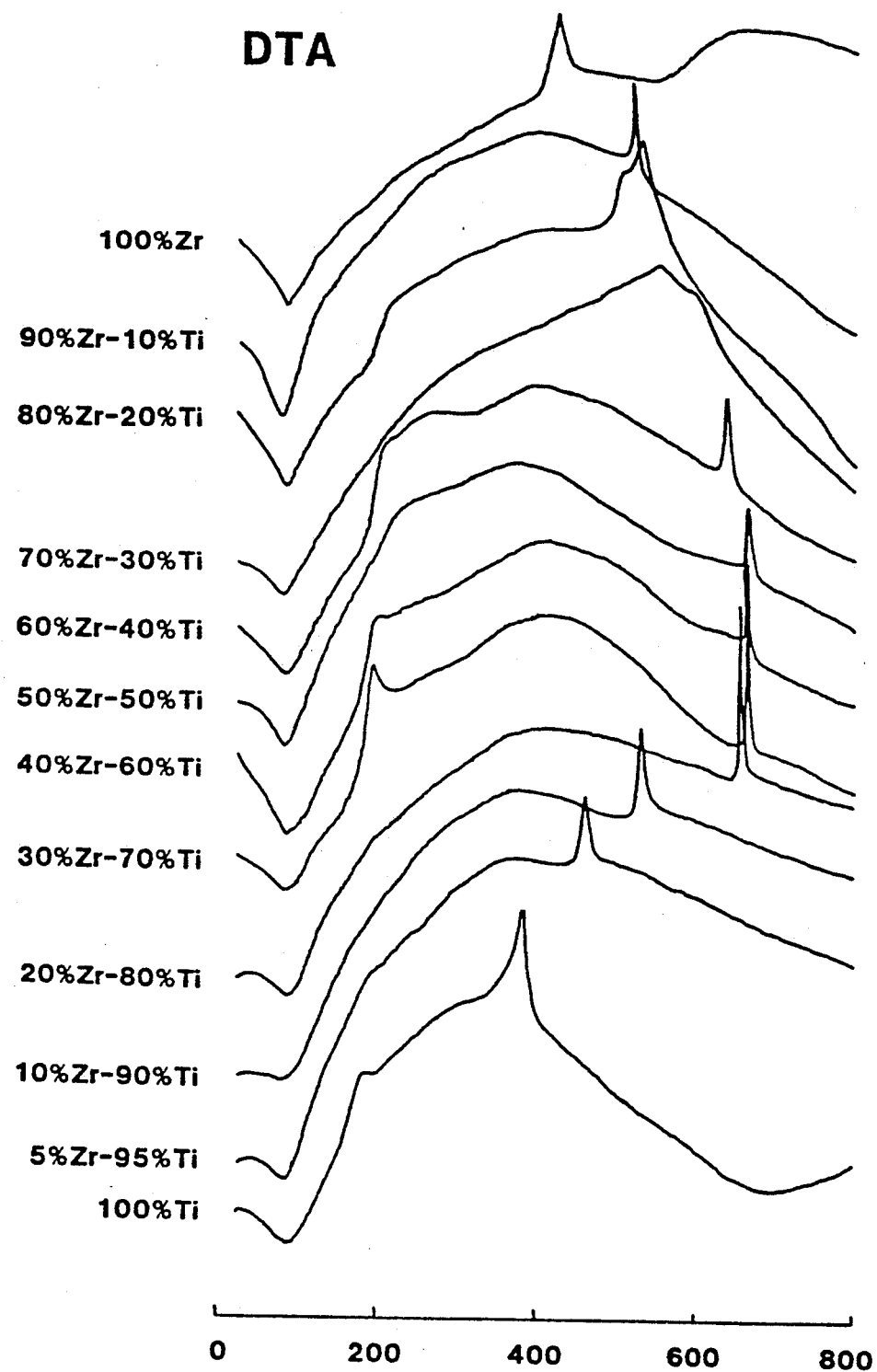
FIG. 12 is a graphical plot of DTA data versus firing temperature both zirconium-doped titanium membranes and titanium-doped zirconium membranes.

Because crystallization has been suggested as the most important change associated with large changes in membrane microstructure, we followed the events by DTA and x-ray analysis. DTA curves of each pure and mixed oxide product are shown in FIG. 12. A sharp exothermic peak overlapping on the big broad exothermic peak indicates crystallization. Therefore, the crystallization temperature of each product is obtained from the peak position. Referring to FIG. 12, we observed that by incorporating $ZrO_2$ into $TiO_2$, we can increase crystallization temperatures, but this increase in crystallization temperature saturates at approximately 30% $ZrO_2$. The crystallization temperature remains constant for products containing 30% to 50% $ZrO_2$. Continuous increasing $ZrO_2$ content results in a decrease in the crystallization temperature until the lowest temperature has been reached for the pure $ZrO_2$ membrane.

Figure 13:
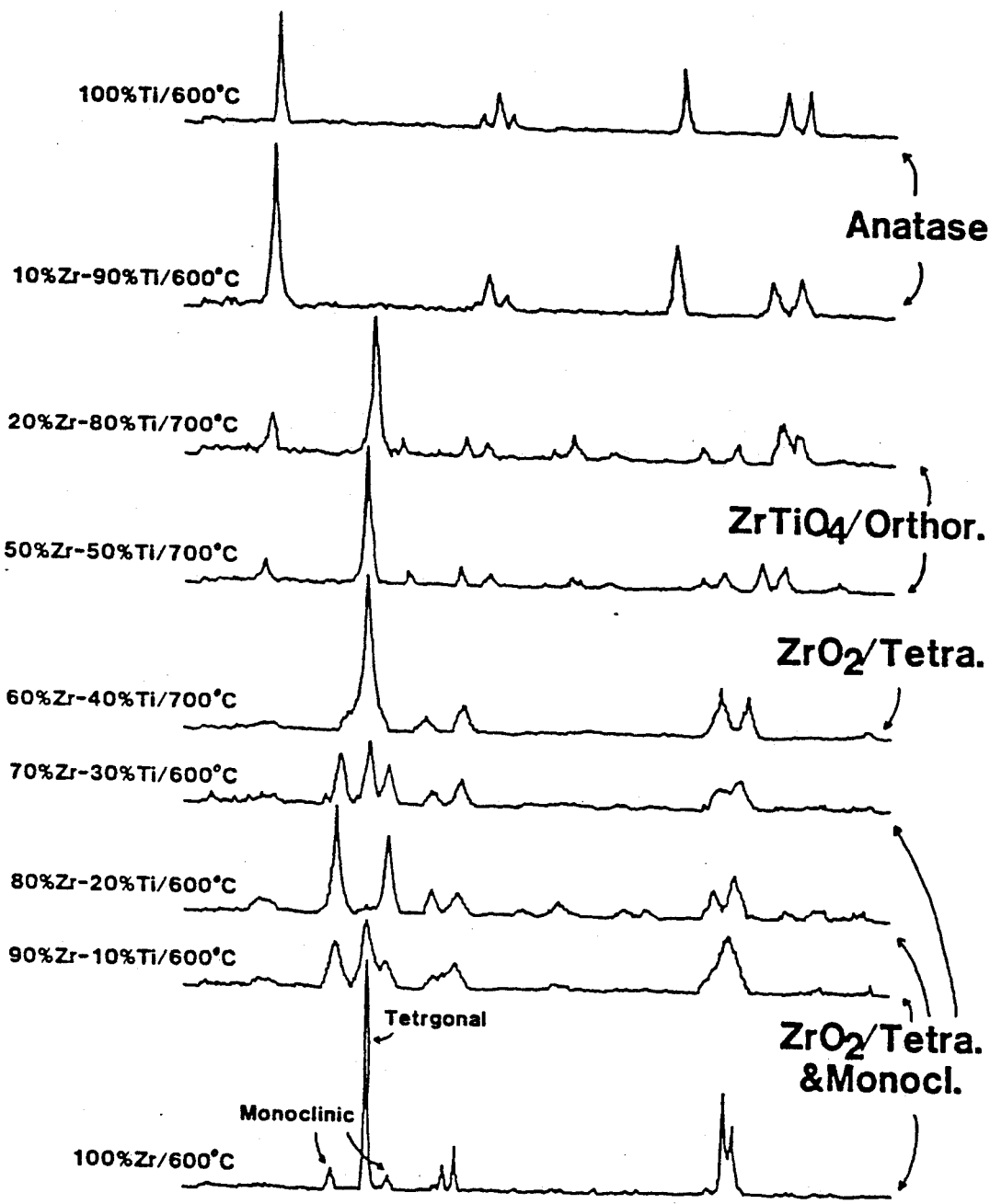
FIG. 13 is a X-ray defraction pattern for various mixed oxide membranes at either 600° C. or 700° C. firing temperature.

In order to compare the initial crystalline form of mixed oxide at each composition, x-ray diffraction patterns have been collected for each membrane sample fired at either 600° C. or 700° C., shown in FIG. 13. Among the rich $TiO_2$ samples, up to 10% $ZrO_2$ seems to be compatibly incorporated into the anatase lattice, forming a solid solution. The addition of more than 20% $ZrO_2$ will produce a new compound, $ZrTiO_4$, which can dissolve the extra $TiO_2$. The fact that the pattern of 20% $ZrO_2$-80% $TiO_2$ sample in FIG. 13 shows a slightly disordered pattern from that of pure $ZrTiO_4$ (50% $ZrO_2$-50% $TiO_2$) provides evidence for the formation of a solid solution. No obvious anatase pattern has been found in this 20% $ZrO_2$-80% $TiO_2$ sample. 50% $ZrO_2$-50% $TiO_2$ sample gives a perfect $ZrTiO_4$ pattern.

Still referring to FIG. 13, rich $ZrO_2$ mixed oxide samples show only $ZrO_2$ patterns, indicating solid solution exists throughout the entire range. A 60% $ZrO_2$-40% $TiO_2$ sample produces largely disordered tetragonal pattern at 700° C., which concurs with the phase diagram proposed by Brown et al., J. Am. Ceram. Soc. 37: 132 (1954). Furthermore, according to Brown's phase diagram, at 700° C., a sample containing from 70% to 90% $ZrO_2$ should separate into tetragonal and monoclinic phases, and the amount of the monoclinic phase should increase with an increasing percentage of the $ZrO_2$ component until only one monoclinic phase exists in the pure $ZrO_2$ sample. In contrast to Brown's phase diagram, our samples display a more complicated change in the relative quantity of both phases with composition. More monoclinic $ZrO_2$ solid solution has been found in the 80% $ZrO_2$ sample compared to 70% $ZrO_2$ sample. This change follows Brown's diagram. However, 90% $ZrO_2$ and even pure $ZrO_2$ samples have been found to contain large quantity of the tetragonal phase instead of the monoclinic phase as predicted by Brown's diagram. This fact can be explained by the presence of extremely small particles and large surface area, which may cause monoclinic phase unstable because monoclinic form has a larger surface excess energy that the tetragonal form.

Figure 14:
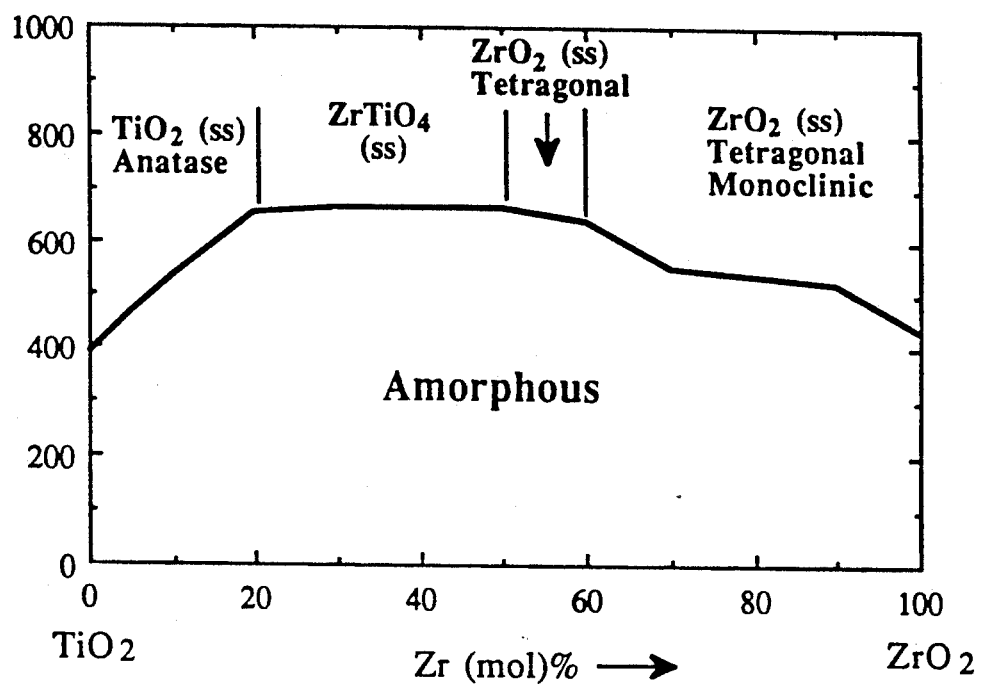
FIG. 14 is a phase diagram of titanium and zirconium mixed oxide membranes.

By combining DTA and x-ray diffraction data, we have constructed a phase diagram of $TiO_2$-$ZrO_2$ mixed oxide membranes in the low temperature range (FIG. 14). Although this diagram does not represent a thermodynamic equilibrium phase diagram, it does characterize the phase transitions in the two component membrane system prepared by sol-gel methods fired at low temperatures.

2. Ti/V Membranes a. Preparation of Ti/V Membranes

A vanadium-doped $TiO_2$ membrane was prepared using the "water-based" sol-gel route in a manner similar to et. al., *J. Membrane Sci.* 39: 243-258 (1988). Titanium ethoxide (25.5 mL), vanadium isopropoxide oxide (4.5 mL), ethanol (25.5 mL), and isopropanol (4.5 mL) were mixed together. This mixture was stirred for 1 hour. The resulting solution is a mixed alkoxide of vanadium and titanium with V/Ti=0.15 in alcohol. Two different V/Ti membranes (5% and 1%) are examined in FIG. 15.

The alkoxide solution was added dropwise to 171 mL of water with the final ratio of $H_2O$ to Ti of 200. The precipitate was peptized by adding 1.5 mL nitric acid ($H^+$/Ti=0.45) and heating to reflux for 8 hours. The resultant stable sol was dried to a gel in polystyrene dishes by removing the water at 56% relative humidity. The gels were heated for four hours at varying temperatures (325° C.-575° C.) to obtain a membrane.

b. Characterization of Ti/V Membranes

The average pore sizes and surface areas of the membranes were determined using an automated nitrogen gas manifold for adsorption and desorption. Surface areas were determined using the BET equation. Pore sizes were calculated from the desorption data using the Kelvin equation and assuming cylindrically shaped pores.

Figure 15:
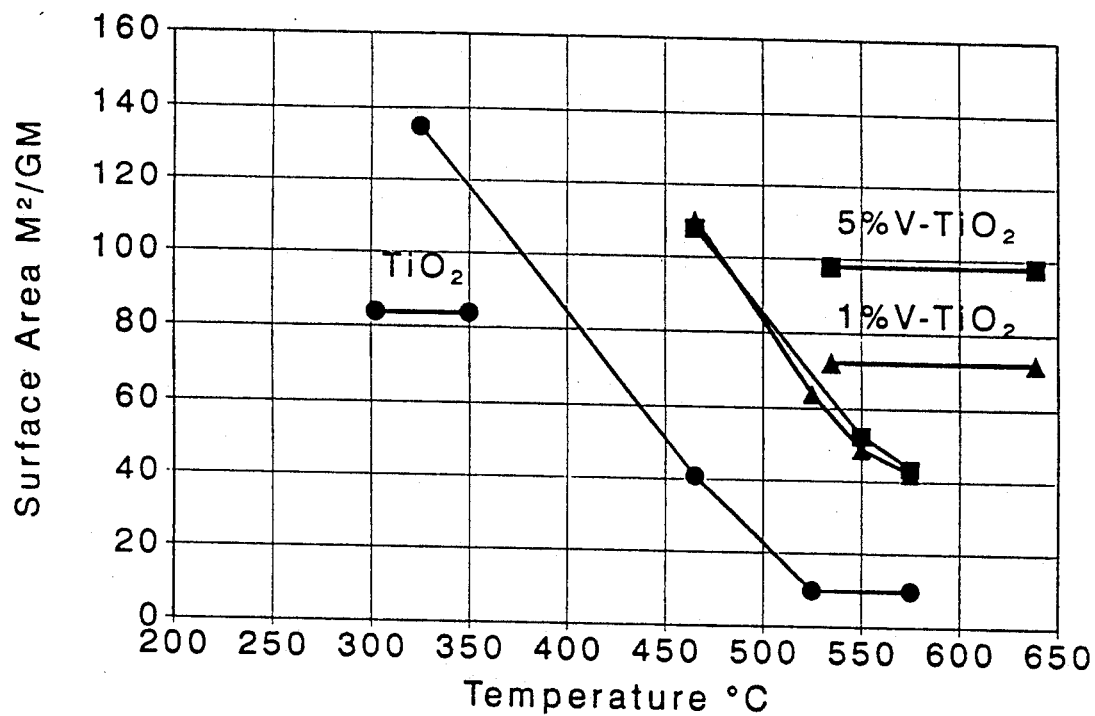
FIG. 15 is a graphical plot of surface area versus firing temperature for vanadian-doped titanium membranes.

The data for membrane surface area as a function of firing temperature for a pure $TiO_2$ membrane and membranes doped with 5% and 1% vanadium are shown in FIG. 15. Referring to FIG. 15, the 5% and 1% vanadium-doped titanium membranes retain a higher surface area at higher firing temperatures compared to the pure titanium membranes. For example, the 5% vanadium-doped membrane has a surface area of approximately 110 $M^2$/gm at a firing temperature of 460° C., while the pure $TiO_2$ membrane has a surface area of 40 $M^2$/gm at the same firing temperature. The pure $TiO_2$ membrane has a surface area of approximately 10 $M^2$/gm at a firing temperature of 525° C., but the 5% vanadium-doped membrane still has a surface area of over 60 $M^2$/gm at the same firing temperature. The vanadium-doped titanium oxide membranes maintained a usefully high surface area of over 40 $M^2$/gm even at firing temperatures of over 550° C.

Figure 16:
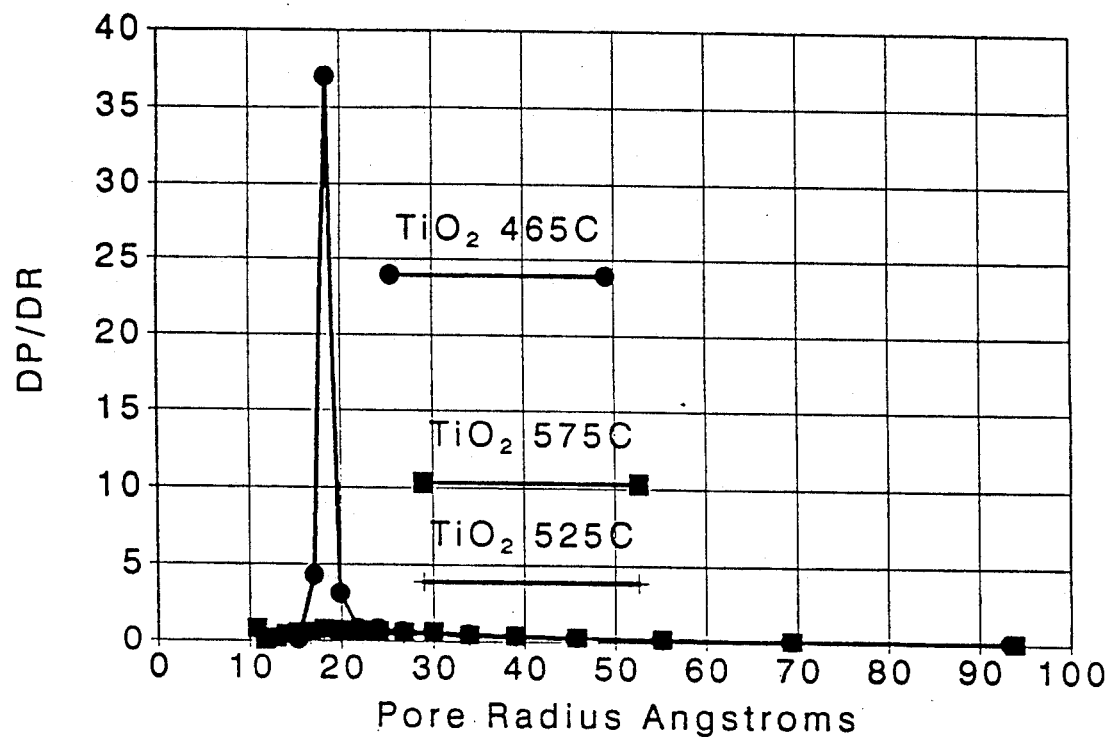
FIG. 16 is a graphical plot of pore radius versus DP/DR for titanium membranes fired at three different temperatures.
Figure 17:
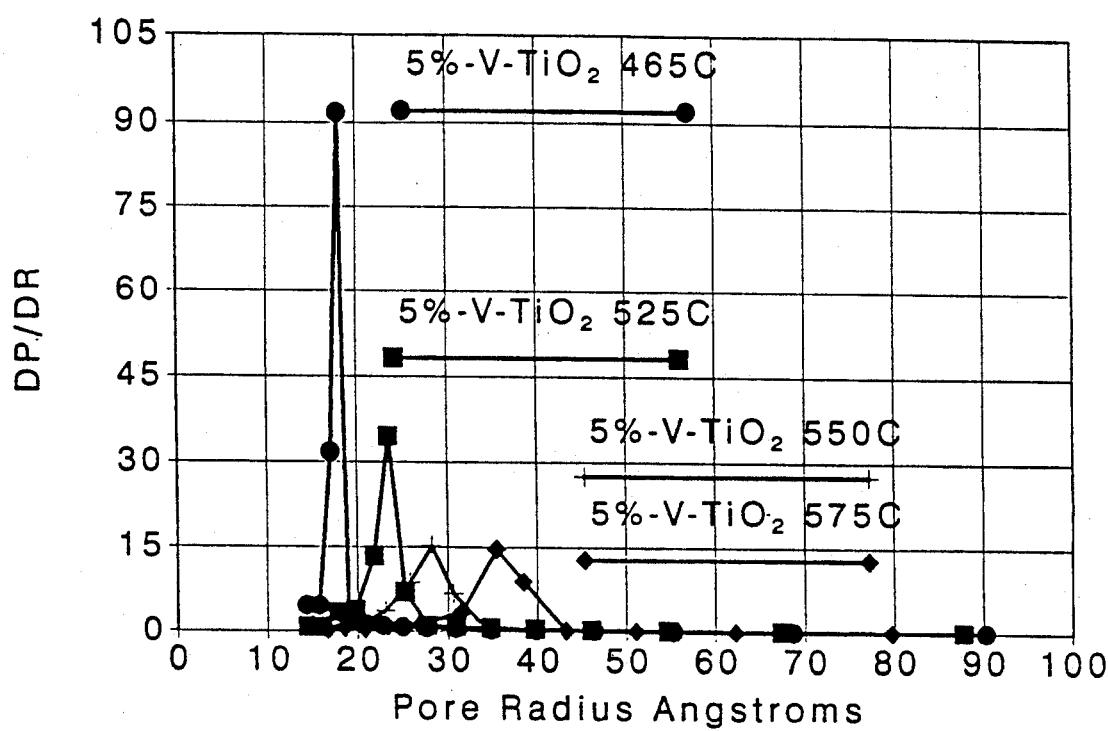
FIG. 17 is a graphical plot of pore radius versus DP/DR for 5% vanadian-doped titanium membranes fired at four different temperatures.

The pore size distributions for membranes fired at different temperatures are given in FIG. 16 and 17. At a firing temperature of 525° C., a 5% vanadium-doped titanium membrane maintains an approximately 25 Angstrom pore diameter while a pure titanium membrane loses most of its measurable porosity.

In summary, both 1% and 5% vanadium-doped titanium membranes retain a larger surface area and pore size distribution at a higher firing temperature than pure $TiO_2$ membranes.

It is to be appreciated that the foregoing examples and specification are by way of illustration and not by limitation and that the present invention embodies modified forms thereof as come within the scope of the following claims.

We claim:

1. A method of creating a metal oxide ceramic membrane having a mean pore size of less than 50 Angstroms with improved thermal stability comprising the steps of:

(a) combining a first metal alkoxide containing a first metal with a second metal alkoxide containing a second metal, quantities of first and second metal alkoxide selected to give a preselected metal ratio is the resultant membrane;

(b) adding to the combination a limited amount of water and an acid in sufficient quantity to peptize the metal oxide;

(c) stirring until a colloidal suspension of small metal oxide particles is formed;

(d) drying the colloidal particles until a gel is achieved; and (e) sintering the gel into a unitary, durable, continuous ceramic membrane having a mean pore size of less than 50 Angstroms at a temperature greater than 400° C., the membrane retaining a mean pore size of less than 50 Angstroms throughout said sintering.

2. The method of claim 1 wherein the ceramic membrane formed in step (e) has a surface area greater than 40 $m^2$/gm.

3. The method of claim 2 wherein the first metal is titanium.

4. The method of claim 3 wherein the second metal is zirconium.

5. The method of claim 4 wherein the amount of zirconium in the ceramic membrane is less than 30% or greater than 80%.

6. The method of claim 3 wherein the second metal is vanadium.

7. The method of claim 6 wherein the amount of vanadium in the ceramic membrane is less than 30%.

8. A ceramic membrane created by the method of claim 1.

9. A ceramic membrane created by the method of claim 2.

10. A ceramic membrane created by the method of claim 3.

11. A ceramic membrane created by the method of claim 4.

12. A ceramic membrane created by the method of claim 5.

13. A ceramic membrane created by the method of claim 6.

14. A ceramic membrane created by the method of claim 7.

15. A composition of matter comprising a porous metal oxide ceramic membrane, the metal atoms in the membrane being selected from at least two transition metals each making up at least 1% of the metal in the membrane, the membrane having a mean pore size or less than 50 Angstroms, and having the characteristic of retaining a mean pore size of less than 50 Angstroms even when heated over 400° C.

16. A composition of matter comprising a porous metal oxide ceramic membrane composed of metal atoms of two different metal elements, the membrane having a mean pore size of less than 50 Angstroms, the relative proportion of metal atoms being selected so that the membrane will retain its mean pore size and porosity when heated to a temperature at least 100° C. higher than the temperature which would degrade the mean pore size and porosity of a metal oxide ceramic membrane made of either metal element alone.

* * * * *